US010099362B2

(12) United States Patent
Wilson et al.

(10) Patent No.: US 10,099,362 B2
(45) Date of Patent: *Oct. 16, 2018

(54) HANDLE ASSEMBLY FOR DRYWALL FINISHER BOX

(71) Applicant: AXIA ACQUISITION CORPORATION, Stone Mountain, GA (US)

(72) Inventors: Mark S. Wilson, Peachtree City, GA (US); Matthew W. Jungklaus, Lawrenceville, GA (US)

(73) Assignee: AXIA ACQUISITION CORPORATION, Stone Mountain, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/259,755

(22) Filed: Sep. 8, 2016

(65) Prior Publication Data

US 2016/0375572 A1 Dec. 29, 2016

Related U.S. Application Data

(63) Continuation of application No. 14/614,153, filed on Feb. 4, 2015, now Pat. No. 9,464,447.

(Continued)

(51) Int. Cl.

*B25G 1/10* (2006.01)
*A47J 45/00* (2006.01)

(Continued)

(52) U.S. Cl.

CPC ................. *B25G 1/04* (2013.01); *B25G 1/06* (2013.01); *B25G 1/102* (2013.01); *E04F 21/165* (2013.01); *Y10T 16/4713* (2015.01)

(58) Field of Classification Search

CPC ... A47L 5/14; A47L 9/32; A47L 9/322; A47L 9/325; A47L 9/327; A01B 1/026;

(Continued)

(56) References Cited

U.S. PATENT DOCUMENTS 77,506 A 5/1868 McGill
274,600 A 3/1883 Hegglund (Continued)

FOREIGN PATENT DOCUMENTS

CA 2035484 8/1991
CA 2031952 3/1992

(Continued)

OTHER PUBLICATIONS

TapeTech Wizard Compact Flat Box Handle for Power Assist TT8000PA. Downloaded Dec. 11, 2016 from http://www.ebay.com/itm/TapeTech-Wizard-Compact-Flat-Box-Handle-for-Power-Assist . . . (1 page).

(Continued)

*Primary Examiner* — Chuck Y Mah
(74) *Attorney, Agent, or Firm* — Michael Best & Friedrich LLP

(57) ABSTRACT

A handle assembly for a container, the container having a pivotally mounted pressure plate for dispensing a seaming compound, includes a connector plate configured for removably coupling to the pressure plate, a first handle for gripping with a first hand of a user, and a second handle for gripping with a second hand of the user. Each of the first handle and the second handle is coupled to the connector plate.

18 Claims, 9 Drawing Sheets

Related U.S. Application Data

(60) Provisional application No. 61/940,736, filed on Feb. 17, 2014.

(51) Int. Cl.

| | |
|---|---|
| ***B25G 1/04*** | (2006.01) |
| ***E04F 21/165*** | (2006.01) |
| ***B25G 1/06*** | (2006.01) |

(58) Field of Classification Search
CPC ........ A01D 34/90; A01D 34/902; B25G 1/10; B25G 1/102; B25G 1/002; B25G 3/00; B25G 3/02; B25G 3/04; B25F 5/006; B25F 5/026; E01H 5/02; E01H 1/0809; Y10T 16/469; Y10T 16/476; Y10T 16/473; Y10T 16/4713; E04F 21/00; E04F 21/24; E04F 21/241; E04F 21/06; E04F 21/16; E04F 21/165; E04F 21/1652; E04F 21/1655
See application file for complete search history.

(56) References Cited

U.S. PATENT DOCUMENTS

| | | | | |
|---|---|---|---|---|
| 701,503 | A | 6/1902 | Plummer | |
| 872,568 | A | 12/1907 | Linderoth | |
| 932,879 | A | 8/1909 | May | |
| 1,828,738 | A | 10/1931 | Hood | |
| 1,939,501 | A * | 12/1933 | Kane | D04B 15/54 403/188 |
| 1,967,748 | A * | 7/1934 | Ehle | E04F 21/00 156/461 |
| 2,302,424 | A | 11/1942 | Delnostro | |
| 2,302,434 | A | 11/1942 | Delnostro | |
| 2,434,356 | A | 1/1948 | Finkelstein | |
| 2,437,827 | A | 3/1948 | Werner | |
| 2,630,703 | A | 3/1953 | Sommers | |
| 2,711,098 | A | 6/1955 | Ames | |
| 2,912,851 | A | 11/1959 | Kames | |
| D188,337 | S | 7/1960 | Cowley et al. | |
| 2,984,857 | A | 5/1961 | Ames | |
| 3,284,898 | A | 11/1966 | Hopkins | |
| 3,363,316 | A | 1/1968 | Skarsten | |
| 3,546,822 | A | 12/1970 | Hutchins | |
| 3,916,472 | A * | 11/1975 | Carder | B05C 17/10 15/235.6 |
| 4,129,407 | A | 12/1978 | Golls et al. | |
| 4,137,670 | A | 2/1979 | Goralski | |
| D263,364 | S | 3/1982 | Bruno | |
| 4,516,868 | A | 5/1985 | Molnar | |
| D282,716 | S | 2/1986 | Heinis | |
| 4,619,013 | A | 10/1986 | Yon | |
| 4,676,031 | A * | 6/1987 | Reiter | B24D 15/04 451/490 |
| 4,774,789 | A | 10/1988 | Amalfi | |
| 4,802,310 | A | 2/1989 | Holmes | |
| 5,016,402 | A | 5/1991 | Reiter | |
| 5,054,248 | A | 10/1991 | Thayer | |
| 5,127,131 | A * | 7/1992 | Corrigan | B64G 1/641 16/422 |
| 5,143,264 | A | 9/1992 | MacMillan | |
| 5,165,144 | A * | 11/1992 | Nisenbaum | B25G 1/00 15/145 |
| 5,309,594 | A | 5/1994 | Thompson | |
| D358,491 | S | 5/1995 | Hoagland | |
| D360,988 | S | 8/1995 | Laubach, III et al. | |
| D362,937 | S | 10/1995 | Camp, Jr. et al. | |
| 5,471,700 | A | 12/1995 | Pereira | |
| 5,479,675 | A * | 1/1996 | Pytlewski | B25G 3/08 15/145 |
| 5,544,384 | A * | 8/1996 | Forselius | E04F 21/163 15/235.7 |
| 5,632,569 | A | 5/1997 | Szmansky | |
| D381,483 | S | 7/1997 | Hartman | |
| D389,562 | S | 1/1998 | Berti | |
| 5,792,489 | A | 8/1998 | Liberman | |
| 5,850,663 | A | 12/1998 | Hardy et al. | |
| D405,960 | S | 2/1999 | King et al. | |
| D426,444 | S | 6/2000 | Hepworth | |
| 6,146,039 | A | 11/2000 | Pool et al. | |
| 6,163,919 | A | 12/2000 | Mitchell | |
| D438,015 | S | 2/2001 | Weiss | |
| 6,216,306 | B1 | 4/2001 | Esterson et al. | |
| 6,263,578 | B1 | 7/2001 | Frantz | |
| 6,379,237 | B1 * | 4/2002 | Gordon | B24D 15/04 451/523 |
| 6,397,427 | B1 * | 6/2002 | Bryngelsson | B25G 1/102 15/143.1 |
| 6,443,825 | B2 | 9/2002 | Schadoffsky et al. | |
| D498,124 | S | 11/2004 | Mitchell | |
| 7,011,570 | B1 | 3/2006 | MacLeod | |
| 7,011,573 | B2 | 3/2006 | McArthur | |
| D532,671 | S | 11/2006 | Skillas | |
| 7,318,716 | B2 | 1/2008 | Castagnetta, Jr. | |
| 7,398,569 | B2 | 7/2008 | Sakaldasis | |
| 7,775,855 | B2 | 8/2010 | Cybulski | |
| D674,259 | S | 1/2013 | Metaxatos et al. | |
| D674,260 | S | 1/2013 | Metaxatos et al. | |
| D682,062 | S | 5/2013 | Metaxatos et al. | |
| 8,438,687 | B2 | 5/2013 | Cybulski et al. | |
| 8,480,457 | B2 * | 7/2013 | Kundel, Jr. | B24B 23/02 15/23 |
| D733,517 | S | 7/2015 | Constantine | |
| 2003/0051303 | A1 | 3/2003 | Hung | |
| 2004/0083579 | A1 * | 5/2004 | Furr-Britt | A47L 9/325 16/421 |
| 2005/0072006 | A1 * | 4/2005 | Lee | E04F 21/163 30/169 |
| 2005/0241839 | A1 | 11/2005 | Demar et al. | |
| 2006/0137123 | A1 | 6/2006 | Sampaio | |
| 2007/0056133 | A1 | 3/2007 | Pyatt et al. | |
| 2007/0067947 | A1 | 3/2007 | Hittmann | |
| 2007/0068008 | A1 | 3/2007 | Wu | |
| 2007/0135028 | A1 | 6/2007 | Carpenter | |
| 2008/0302214 | A1 | 12/2008 | Hoffman | |
| 2009/0255075 | A1 * | 10/2009 | Carlson | A47L 13/34 15/104.94 |
| 2010/0092232 | A1 | 4/2010 | Gallardo | |
| 2011/0252653 | A1 * | 10/2011 | Twedell | B27B 5/29 30/519 |
| 2011/0289721 | A1 | 12/2011 | Allen | |
| 2012/0090264 | A1 * | 4/2012 | Goss | B27C 1/005 52/741.4 |
| 2013/0047381 | A1 | 2/2013 | Zorn | |

FOREIGN PATENT DOCUMENTS

| | | |
|---|---|---|
| DE | 2816485 | 10/1979 |
| DE | 19507955 | 9/1996 |

OTHER PUBLICATIONS

Drywall Finisher Box, Bing Images, <http://www.bing.com/images/search?q=drywall+finisher+box&qpvt+drywall+finisher+box> downloaded Feb. 5, 2015 (2 pages).

Tape Tech-Flat-Box-Handle_2, <http://www.all-wall.com/TapeTech-Flat-Box-Handle_2.jpg> downloaded Feb. 5, 2015 (1 page).

Roofers Choice Hand Metal Seamer, 6 in. Straight, <http://www.bestmaterials.com/detail.aspx?ID=20171> downloaded Feb. 5, 2015 (2 pages).

Drywall-Master-12in-Super-Finish-Flat-B, <http://www.all-wall.com/Drywall-Master-12in-Super-Finish-Flat-Box-Handle-12101_lg.jpg> Downloaded Feb. 5, 2015 (1 page).

International Search Report for Application No. PCT/US2015/014474 dated May 8, 2015 (8 pages).

International Written Report for Application No. PCT/US2015/014474 dated May 8, 2015 (4 pages).

(56) References Cited

OTHER PUBLICATIONS

Extended European Search Report from the European Patent Office for Application No. 15749225.7 dated Oct. 30, 2017 (6 pages).

* cited by examiner

HANDLE ASSEMBLY FOR DRYWALL FINISHER BOX

CROSS-REFERENCE TO RELATED APPLICATIONS

This application is a continuation of U.S. patent application Ser. No. 14/614,153, filed Feb. 4, 2015, which claims priority to U.S. Provisional Patent Application No. 61/940,736, filed Feb. 17, 2014, the entire contents of each being incorporated herein by reference.

BACKGROUND

The present disclosure relates to handles for a container. In particular, the present disclosure relates to finisher boxes and handles for finisher boxes.

Mastic or other seaming compounds are typically applied over seams in drywall and other building materials. These seaming compounds are viscous and dispensed from containers such as flat finisher boxes, which are used to apply finish coats of joint compound over taped drywall joints. Flat finisher boxes currently include handles that allow the operator to control the orientation of the box during use and to extend his reach. Controlling the orientation is a matter of allowing the box to pivot from the handle or locking the handle in place when the operator applies a locking mechanism (i.e., a brake lever) at a distal end of the handle. Conventional handles for finisher boxes come in a variety of lengths, generally from about 34" long to as long as 72" or longer.

SUMMARY

In one embodiment, a handle assembly for a container, the container having a pivotally mounted pressure plate for dispensing a seaming compound, includes a connector plate configured for removably coupling to the pressure plate, a first handle for gripping with a first hand of a user, and a second handle for gripping with a second hand of the user. Each of the first handle and the second handle is coupled to the connector plate.

In another embodiment, a handle assembly for a container includes a pressure plate configured for rotatably coupling to the container, a first handle, and a second handle having a longitudinal axis extending substantially orthogonally to the pressure plate. The first handle and the second handle are directly coupled to each other. At least one of the first handle and the second handle is coupled to the pressure plate.

In yet another embodiment, a handle assembly for a container, the container having a pivotally mounted pressure plate for dispensing a seaming compound, includes a connector plate configured for removably coupling to the pressure plate, a first handle for gripping with a first hand of a user, and a second handle for gripping with a second hand of the user. The second handle includes a first end and a second, distal end opposite the first end. The first end is coupled to the connector plate. The second end is spaced from the connector plate. The first handle is coupled to the second handle between the distal end of the second handle and the connector plate.

Other aspects of the disclosure will become apparent by consideration of the detailed description and accompanying drawings.

DETAILED DESCRIPTION

Figure 1:
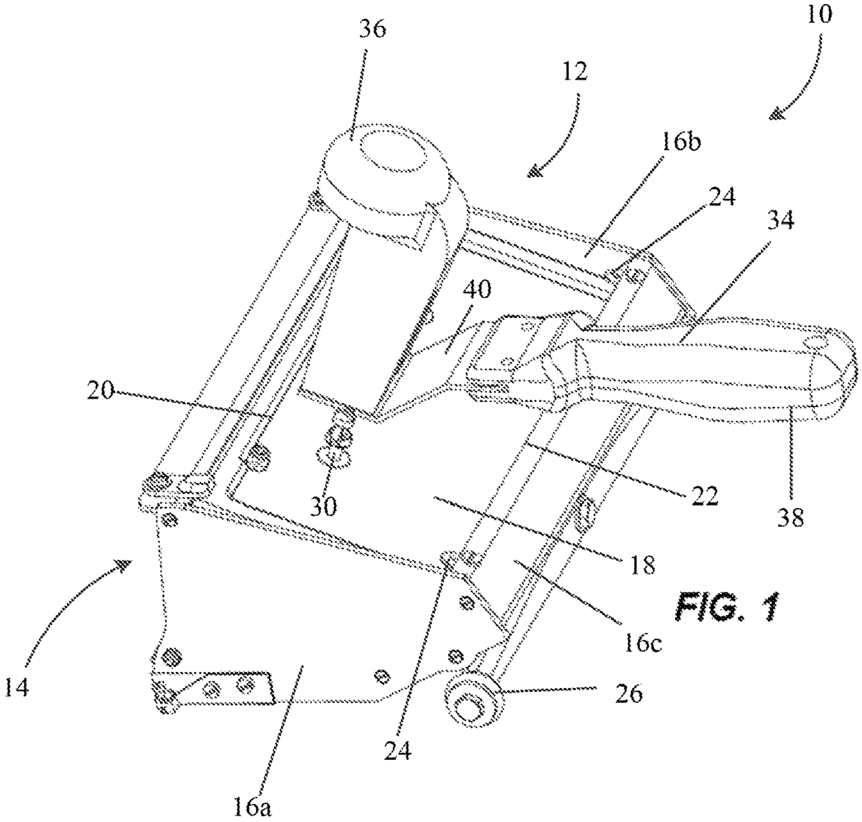
FIGS. 1-4 illustrate perspective views of a container or finisher box with a handle assembly according to a first embodiment of the disclosure.
Figure 2:
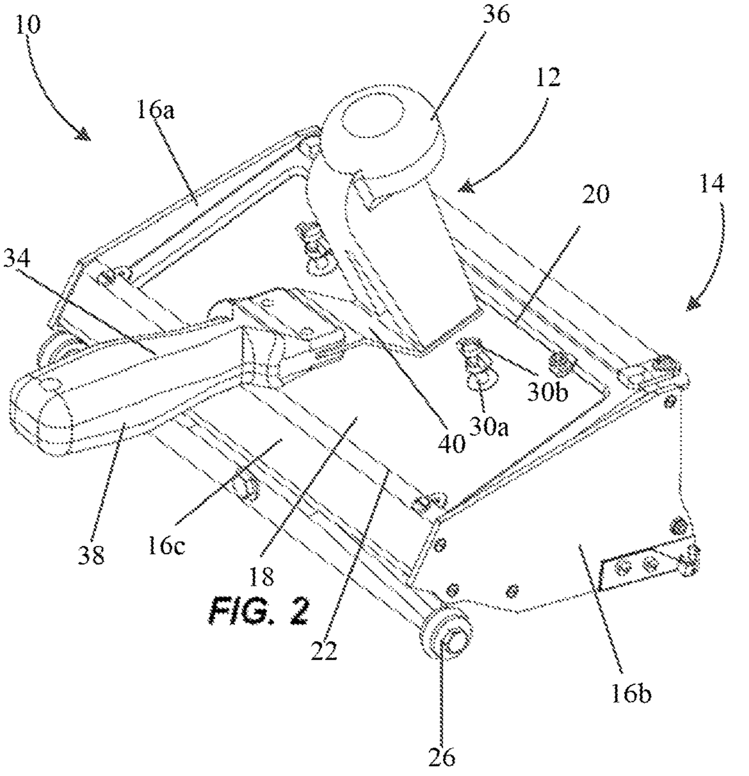
Figure 3:
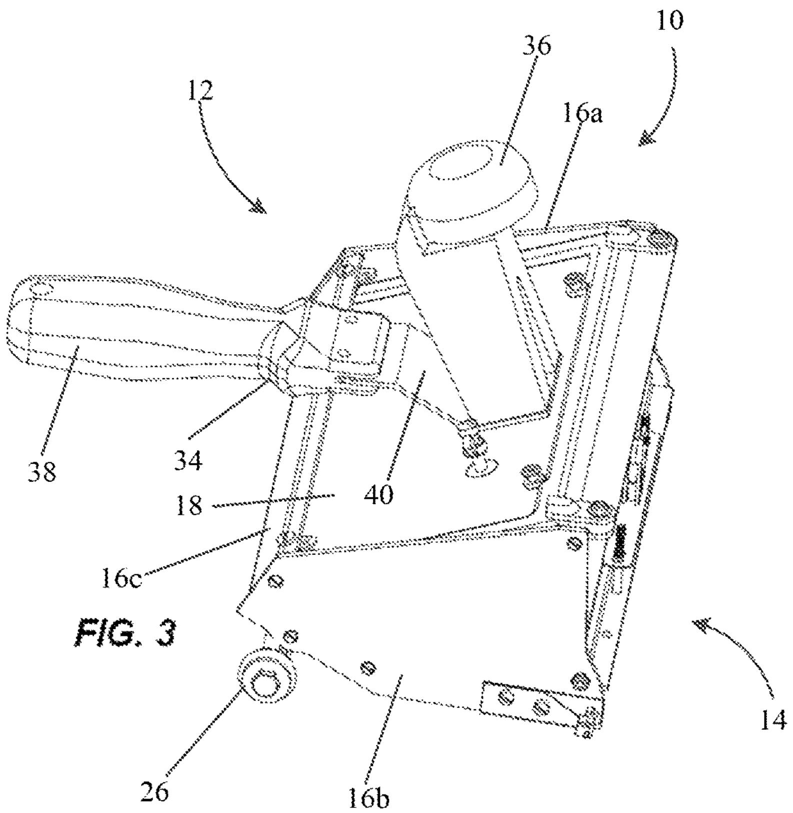
Figure 4:
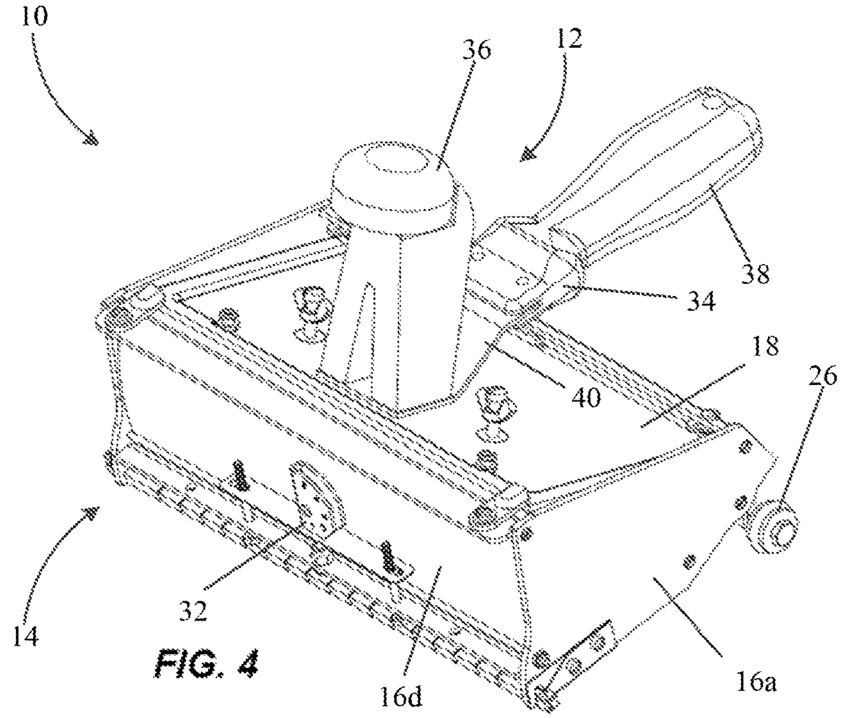
Figure 5:
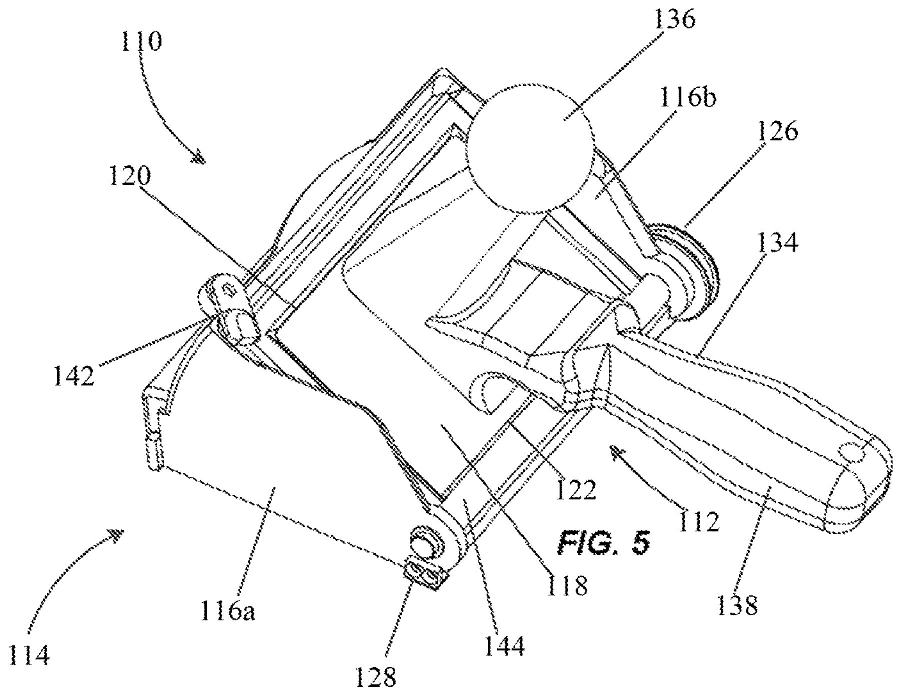
FIGS. 5-8 illustrate perspective views of a container or finisher box with a handle assembly according to a second embodiment of the disclosure.
Figure 6:
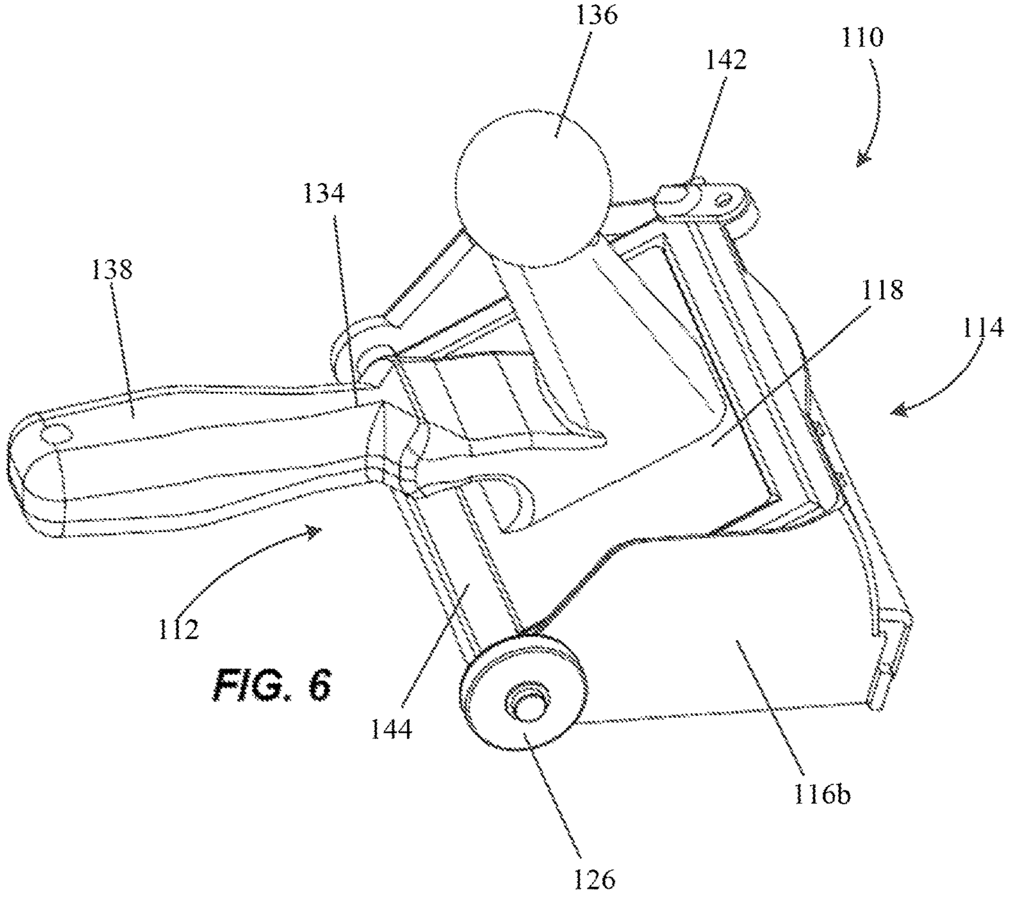
Figure 7:
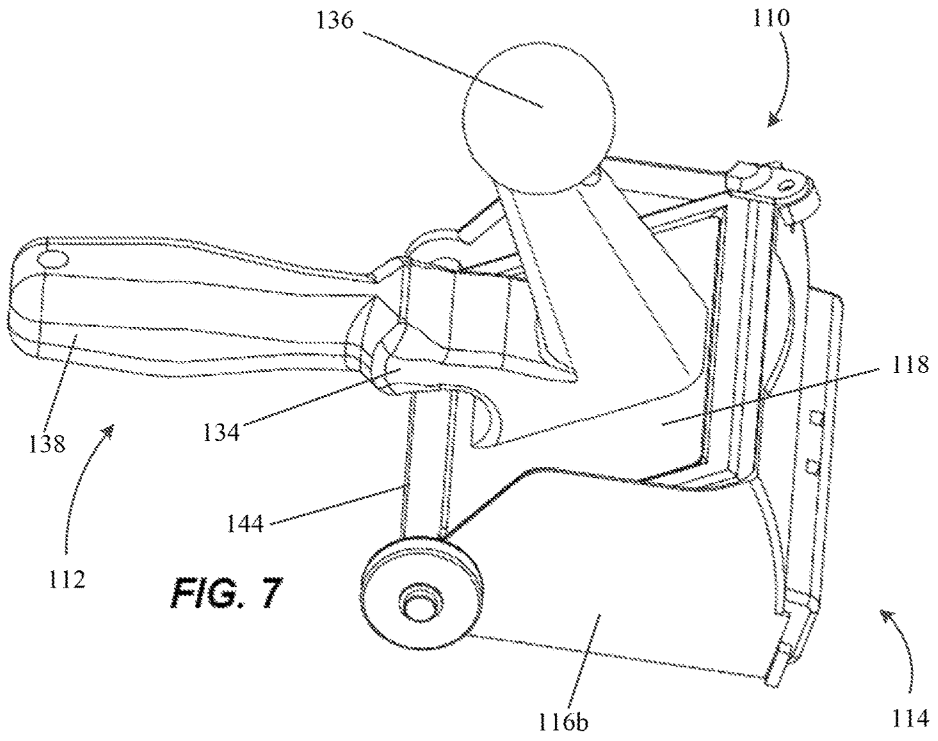
Figure 8:
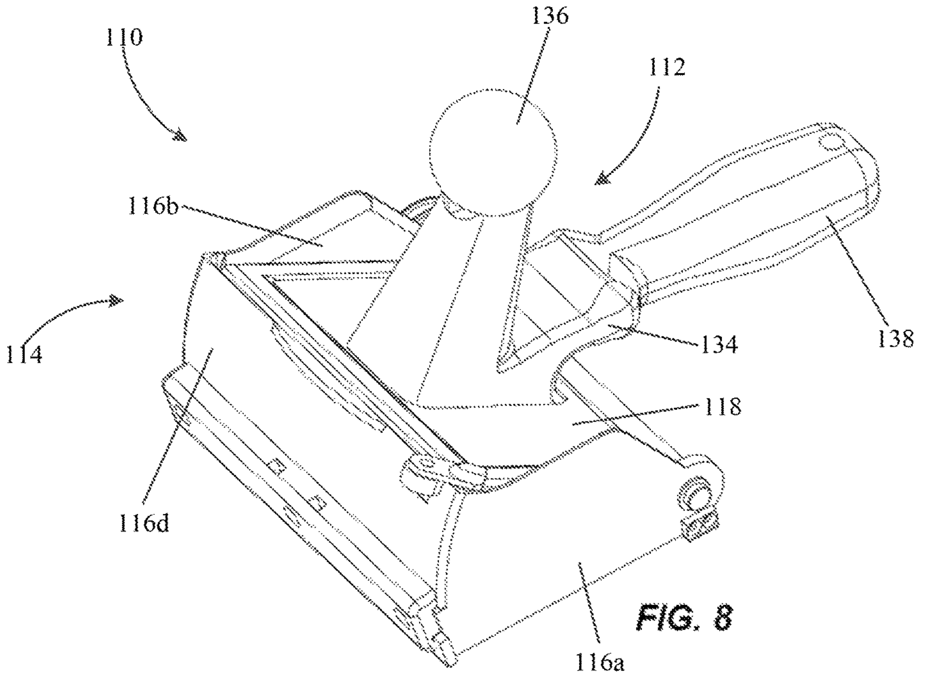

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

FIGS. 1-4 illustrate a container or finisher box 10 including a handle assembly or accessory 12 according to a first embodiment of the disclosure. For the purposes of this application, the finisher box 10 is for drywall finishing. Drywall finishing is described herein as an example for what the various embodiments of the handle assembly 12 may be used for.

The finisher box 10 also includes a body or housing 14 with a bottom wall and spaced apart sides 16*a*, 16*b*, 16*c*, 16*d*. The bottom wall and the sides 16*a*-16*d* are adapted to receive joint compound in a cavity they form. The bottom wall and sides 16*a*-16*d* may be formed as one piece or coupled by any suitable fastener. A top wall or pressure plate 18 includes a first edge 20 and a spaced second edge 22 that may be parallel to the first edge 20. The pressure plate 18 is retained within the finisher box 10 and is pivotable within the finisher box 10 relative to the sides 16*a*-16*d*. In particular, the first edge 20 is slidable along the side 16*d*, which essentially forms a front wall, while the second edge 22 remains positioned substantially adjacent the side 16*c* (which essentially forms a back wall). In the illustrated embodiment, two fasteners 24 (i.e., set screws) define a stop that prevents the pressure plate 18 from being completely displaced from the finisher box 10. Other structures may retain the pressure plate 18 relative to the finisher box 10. For example, in the embodiment of FIGS. 10-11, which will be described in greater detail below, two rotatable latches 242 define the stop that prevents the pressure plate 218 from separating from the finisher box 210. The finisher box 10 also includes an opening or aperture (not shown) located between adjacent edges or surfaces of the bottom wall and the side 16*d*, through which joint compound or a seaming compound can be extruded. As the pressure plate 18 is pushed along the side 16*d* toward the bottom wall, seaming compound is forced out through the aperture. In the illustrated embodiment, the aperture is substantially the same length the bottom wall and side 16*d*, although the aperture in other embodiments may be any suitable length. The side 16*d* or bottom wall also includes a blade finisher, which helps to evenly distribute and smooth the seaming compound as it is pushed out of the aperture. The finisher box 10 may also include wheels 26 to facilitate movement of the box 10 against the wall. The finisher box 10 may also include a skid or skids 128 in place of one or both of the wheels 26, as illustrated in FIGS. 5-8. Additionally, fasteners 30 (i.e., stubs or screws 30*a* and wingnuts 30*b*, respectively) may be coupled to the pressure plate 18, and a tensioning mechanism 32 may be included on the side 16*d* for adjusting the amount of seaming compound crown when filling the cavity between the drywall panels.

The handle assembly 12 according to the first embodiment of the disclosure is coupled to the finisher box 10 and includes a first handle 34 (i.e., a knife handle) and a second handle or a push post 36. In particular, the first handle 34 is coupled to the pressure plate 18. The first handle 34, which is shaped and sized similarly to a conventional knife handle, is also sized and shaped to fit comfortably in the operator's hand and gives the operator much improved leverage and control when maneuvering the box 10 during use, as compared with conventional handles. For example, the operator can use the box 10 with one hand by holding only the first handle 34. Additionally, the first handle 34 may include a grip 38, which defines a first gripping portion that emulates the size and shape of the grip used on standard drywall finisher knives, thereby allowing the operator to operate the finisher box 10 much like he would a finisher knife. Drywall finishers are very comfortable using a tool in this way.

The push post 36 may be coupled to one or both of the pressure plate 18 and the first handle 34. The first handle 34 and the push post 36 are positioned in close proximity to one another. In the embodiment of FIGS. 1-4, the first handle 34 and the push post 36 are coupled to one another on the pressure plate 18. As such, while the operator holds the first handle 34 with one hand, he may use his other hand to manipulate the push post 36. Dual use of both the first handle 34 and the push post 36 gives the operator substantial control over the path of the finisher box 10. Pressure applied by hand to the push post 36 gives much more leverage as well, which helps to push the seaming compound out of the finisher box 10 (and onto the wall to be finished). The pressure is applied orthogonally to the pressure plate through the push post 36, therefore not wasting a user's energy. In the embodiment illustrated in FIGS. 1-4, the first handle 34 and the push post 36 are bolted to the pressure plate 18 of the finisher box 10. However, the first handle 34 and the push post 36 may be secured in other ways to the pressure plate 18, as described below and shown in FIGS. 5-8. The push post 36 and the first handle 34 may also be attached to one another or to the pressure plate 18 in one of the ways as described above and below, or in other ways not described within.

In the embodiment illustrated in FIGS. 1-4, the push post 36 is connected to the first handle 34 by an attachment piece 40 (e.g., a piece of sheet metal). The attachment piece 40 is stiff enough that the operator can control the box 10 very well and also apply enough pressure to the pressure plate 18 to push the seaming compound out of the box 10 and onto the wall to be finished. In other embodiments, the attachment piece 40 may be rather flexible. In those embodiments, the first handle 34 is pivotable at the attachment piece 40 relative to the pressure plate 18 to allow the operator to find a hand position that is most comfortable. The first handle 34 has a longitudinal axis defining an acute angle relative to the pressure plate 18.

The push post 36 is bolted (or otherwise fastened) directly onto the pressure plate 18 or the attachment piece 40, and the push post 36 extends substantially orthogonally from the pressure plate 18. A longitudinal axis of the push post 36 defines an angle relative to the pressure plate 18 that is greater than the angle formed by the longitudinal axis of the first handle 34 to the pressure plate 18. Additionally, as illustrated, the push post 36 is positioned near the first edge 20 of the pressure plate 18, which allows the operator to get maximum mechanical advantage on the plate 18 and reduces the amount of pressure and effort to push seaming compound out of the finisher box 10. The push post 36 is substantially rounded (i.e., knob shaped) at a distal end to be comfortable in the palm of the operator's hand and to define a second gripping portion.

The entire handle assembly could also be made in one piece, such as by molding or casting. FIGS. 5-8 illustrate a container or finisher box 110 including a handle assembly or accessory 112 according to a second embodiment of the invention. Therefore, structure of the second embodiment similar to the first embodiment will be identified with reference numerals of the first embodiment plus "100," and only the differences will discussed herein.

FIGS. 5-8 show the pressure plate 118, the first handle 134, and the push post 136 molded as a one-piece assembly. The one-piece assembly is shaped substantially similar to the design as shown in FIGS. 1-4. However, notably, the embodiment illustrated in FIGS. 5-8 may or may not include features on a top side of the pressure plate 118, such as the fasteners 30*a*, 30*b*. Similarly, the handle 134 may be formed as one piece with the pressure plate 118. In that embodiment, the push post 136 may be formed as one piece with either the pressure plate 118 or the first handle 134. The push post 136 and the first handle 134 may also be attached to one another or to the pressure plate 118 in one of the ways as described above and below, or in other ways not described within.

The second embodiment shows one wheel 126 and one skid 128, but may include a second wheel 126 in place of the skid 128 or a second skid 128 in place of the wheel 126. The skid 128 is configured to reduce the contact area between the wall and the finisher box 110 at an end of the finisher box 110 opposite the aperture, therefore making maneuvering the finisher box 10 along the wall easier. Preferably, the finisher box 110 will include wheels 126 on both sides, or skids 128 on both sides. An axle 144, molded with the pressure plate 118 in the illustrated embodiment, provides attachment points on its opposite ends for the wheels 126. The pressure plate 118 is held in place through a rotatable latch 142 at a corner of the pressure plate 118 and the finisher box 110.

In reference to both the first and the second embodiments, one or both of the first handle 34, 134 and the push post 36, 136 may be used to move the box 10, 110 along a drywall joint and push the seaming compound out of the finisher box 10, 110 and onto the wall. The connection of the first handle 34, 134 and the push post 36, 136 to the pressure plate 18, 118 gives the operator increased leverage on the pressure plate 18, 118 as compared with the single handles that are standard in the industry. Experienced drywall finishers will be very comfortable manipulating the box 10, 110 with the first handle 34, 134 because holding only the first handle 34, 134 works and feels very much like using a drywall finishing knife. As such the handle assembly for the finisher box 10,

110 of the present invention is ideal for all drywall projects regardless of the operator's skills and experience finishing drywall.

Figure 9:
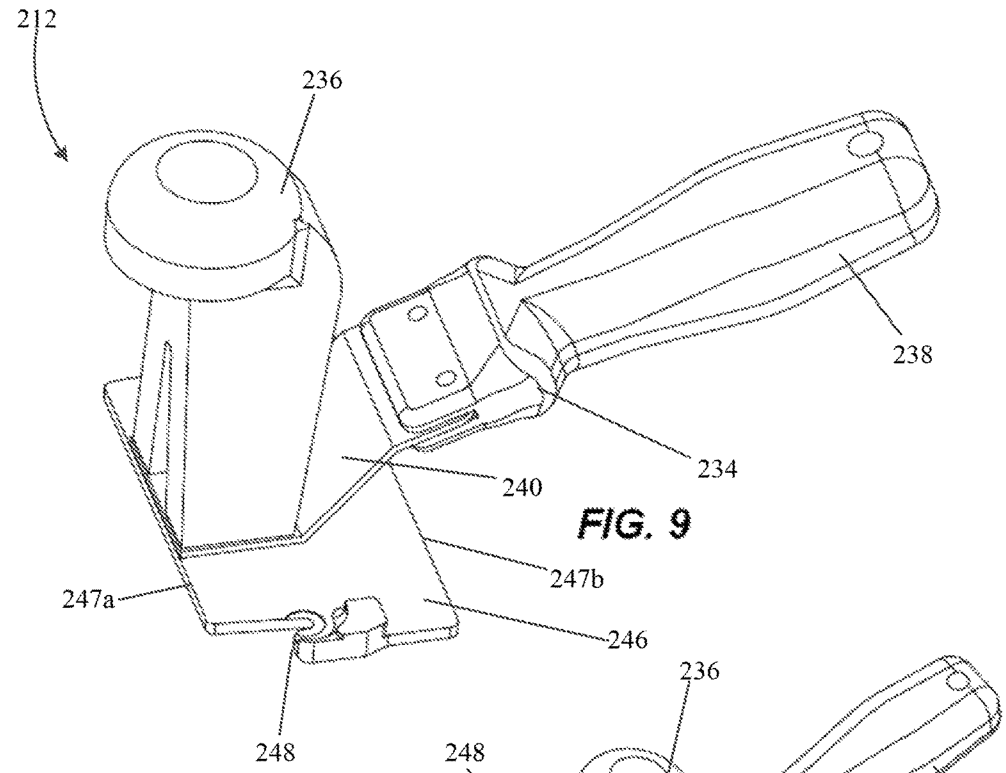
FIG. 9 illustrates a perspective view of a handle assembly including a connecter plate for a container or finisher box according to a third embodiment of the disclosure.
Figure 10:
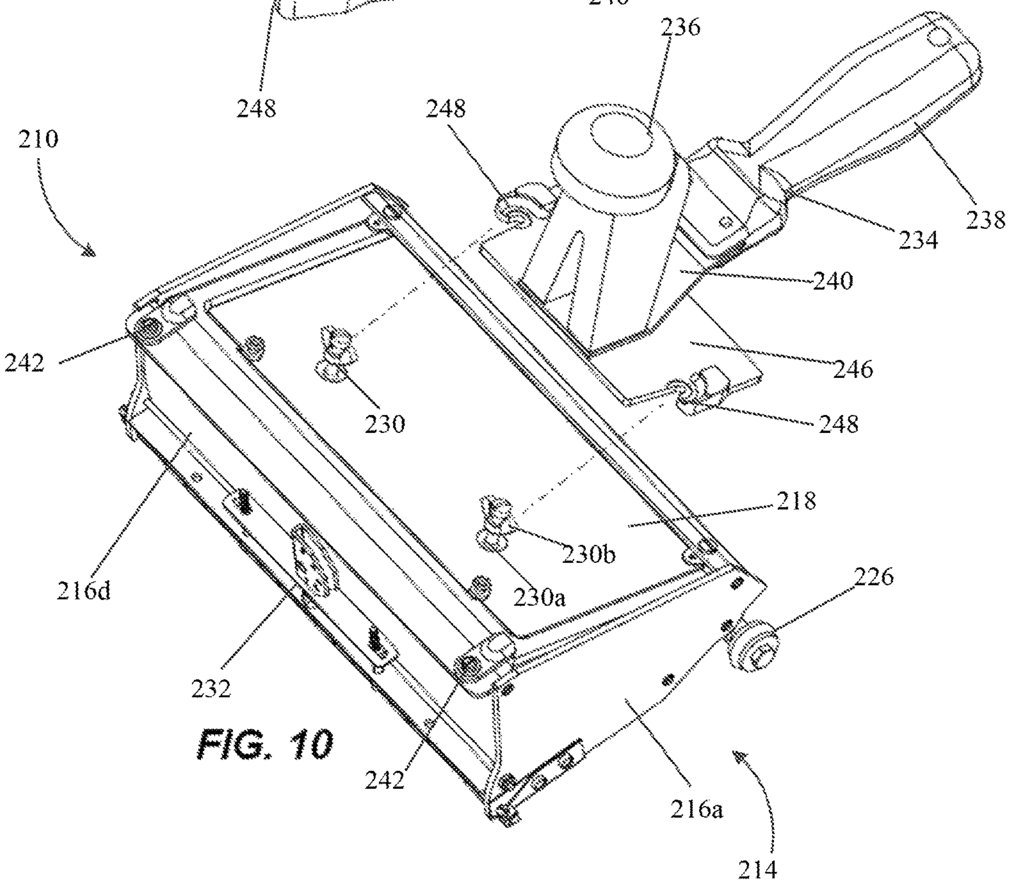
FIG. 10 illustrates a partially exploded perspective view of a container or finisher box with the handle assembly of FIG. 9.
Figure 11:
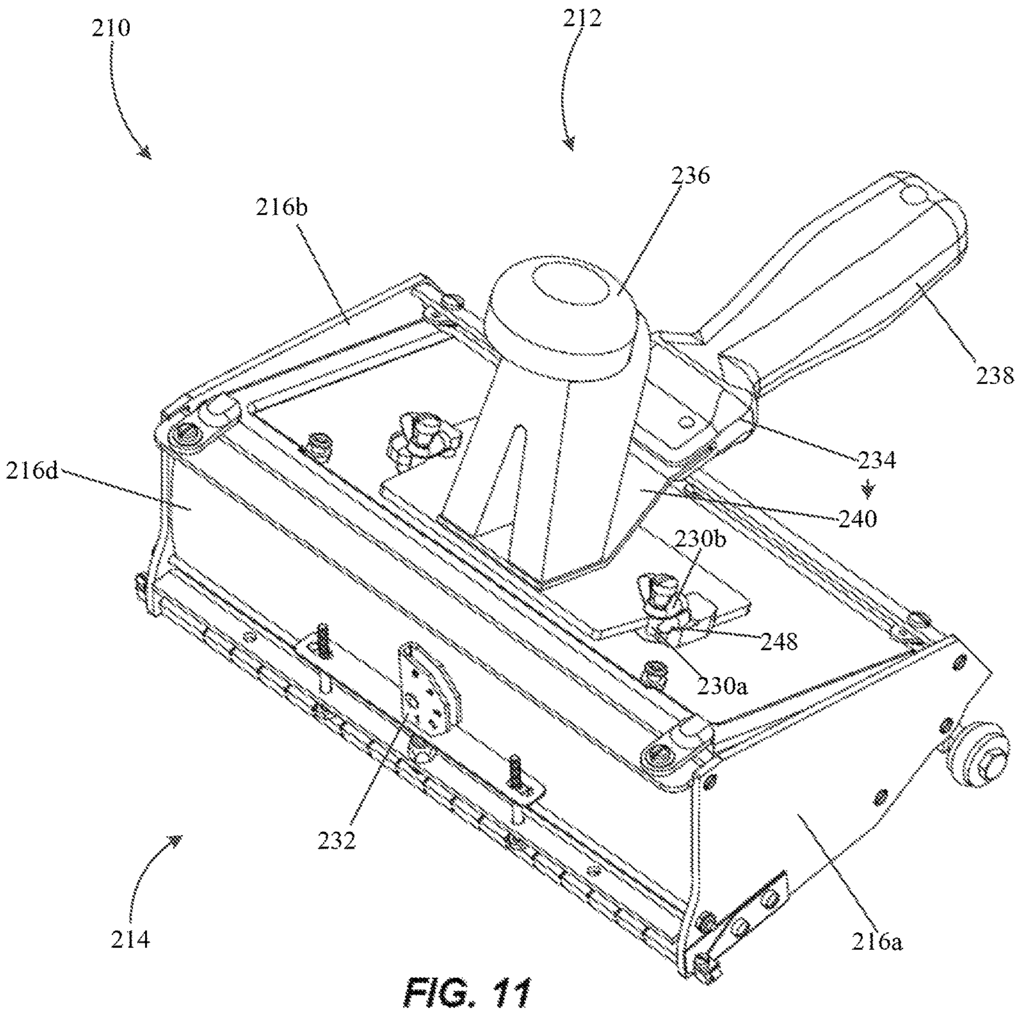
FIG. 11 illustrates a perspective view of the finisher box and the handle assembly of FIG. 10, including the handle assembly coupled to the finisher box.

FIGS. 10-11 illustrate a container or finisher box 210 according to a third embodiment of the invention that includes a removable handle assembly or accessory 212. The finisher box 210 and the handle assembly 212 of FIGS. 9-11 have similar structure to that of the finisher box 10 and the handle assembly 12 of FIGS. 1-4. Therefore, structure of the third embodiment similar to the first embodiment will be identified with reference numerals of the first embodiment plus "200."

The first handle 234 and the push post 236 are coupled to a connector plate 246, forming the handle assembly 212 which is removably coupled to the pressure plate 218 of the finisher box 210. The connector plate 246 includes a first edge 247*a* and a spaced second edge 247*b* that may be parallel to the first edge 247*a*. In the illustrated embodiment, the push post 236 is positioned near the first edge 247*a* of the connector plate 246, which allows the operator to get maximum mechanical advantage on the pressure plate 218 through the connector plate 246 and reduces the amount of pressure and effort to push seaming compound out of the finisher box 210. The push post 236 is connected to the first handle 234 by the attachment piece 240 (e.g., a piece of sheet metal). The attachment piece 240 may be coupled to the connector plate 246 by fasteners or other coupling means.

The connector plate 246 also includes two openings or notches 248. The two notches 248 are sized and shaped to receive fasteners 230 (i.e., studs 230*a* and wingnuts 230*b*, respectively) provided on most commercially available flat finisher boxes. As a result, an operator that already owns a conventional finisher box can attach the handle assembly 212 very easily to his finisher box. This way, the handle assembly 212 may be attached as an auxiliary accessory to be used when desired.

To assemble the finisher box 210, the operator unscrews the wingnuts 230*b* away from the pressure plate 218 and slides the connector plate 246 under the wingnuts 230*b* (i.e., between the pressure plate 218 and the wingnuts 230*b*). The notches 248 receive the studs 230*a* disposed between the pressure plate 218 and the wingnuts 230*b*. The connector plate 246 is slid under the wingnuts 230*b* until the notches 248 in the plate 246 fully seat against the studs 230*a*. Once the connector plate 246 is appropriately positioned, the wingnuts 230*b* are tightened against the connector plate 246 such that the handle assembly 212 is secured to the pressure plate 218 of the finisher box 210, which is ready for use.

In reference to the first, second, and third embodiments, the handle 34, 134, 234 may be formed as one piece with the pressure plate 18, 118, 218. Similarly, any combination of the handle 34, 134, 234, the push post 36, 136, 236, the pressure plate 18, 118, 218, and/or the connector plate 246 may be formed as one piece in other embodiments, and as similarly shown in FIGS. 5-8. The push post 236 and the first handle 234 may also be attached to one another or to the connector plate 246 in one of the ways as described above and below, or in other ways not described within.

The connector plate 246 may have any suitable shape and size, including that illustrated in FIGS. 9-11. Though it is possible to operate a finisher box 10, 110, 210 by grasping only the first handle 34, 134, 234, using both the first handle 34, 134, 234 and the push post 36, 136, 236 is advantageous. For example, using two hands on the handle assembly 12, 112, 212, placed close to the box 10, 110, 210 gives exceptional control of the box 10, 110, 210 as it is moved along the drywall joint to be finished. Because of the leverage the push post 36, 136, 236 gives, applying pressure with both hands greatly reduces the overall effort required to push seaming compound out of the finisher box 10, 110, 210 especially when compared to the forces that must be generated to use any of the current finisher box handles.

Figure 12:
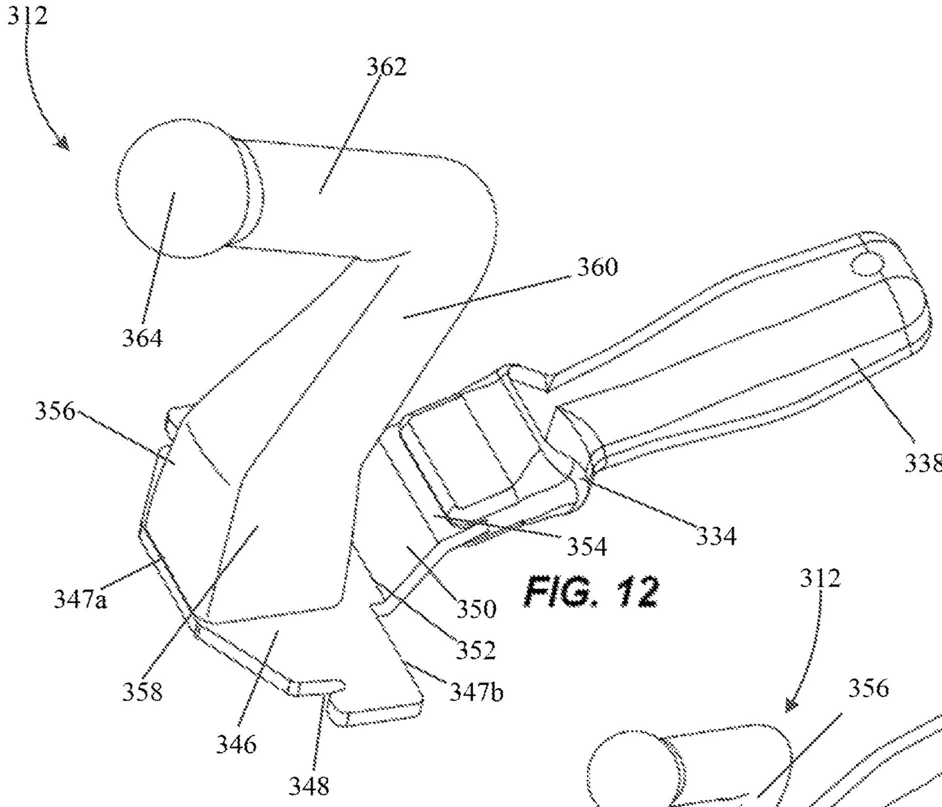
FIG. 12 illustrates a perspective view of a handle assembly including a connecter plate for a container or finisher box according to a fourth embodiment of the disclosure.
Figure 13:
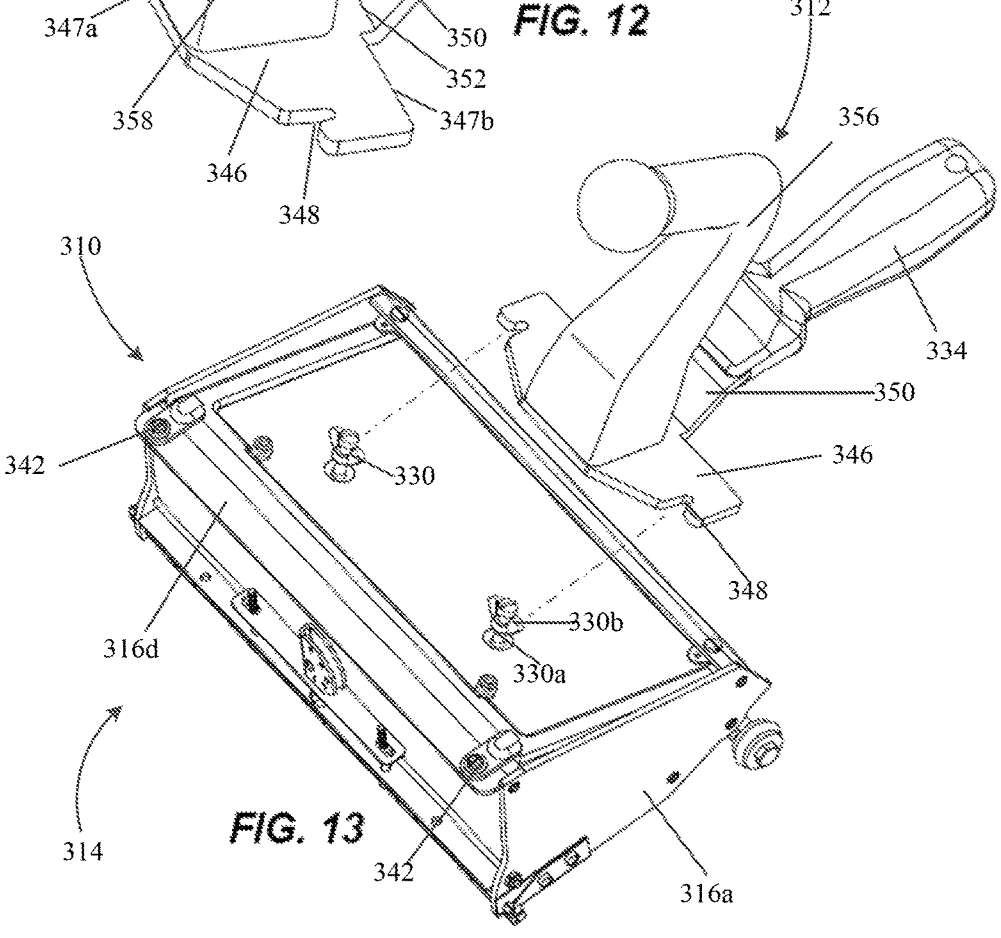
FIG. 13 illustrates a partially exploded perspective view of a container or finisher box with the handle assembly of FIG. 12.
Figure 14:
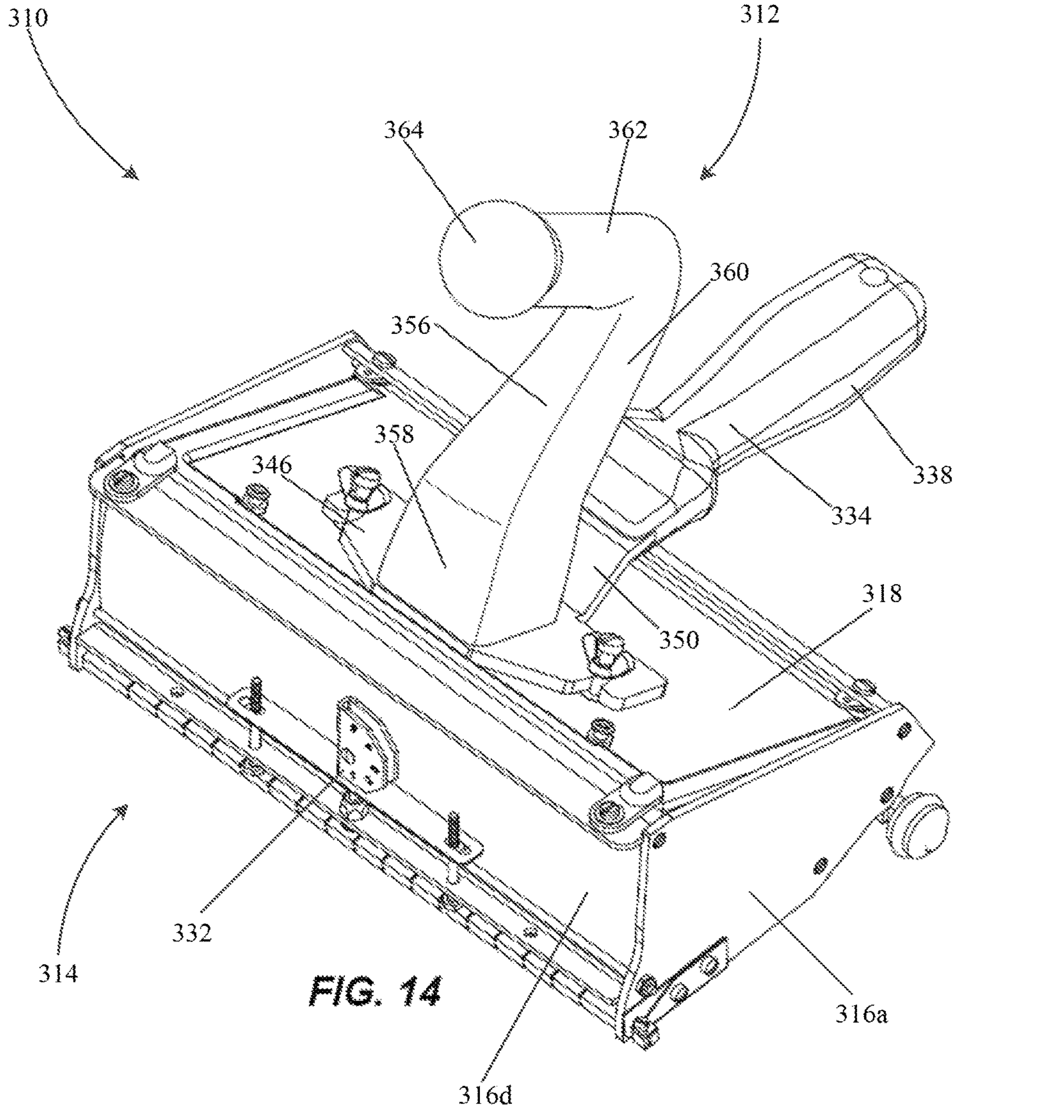
FIG. 14 illustrates a perspective view of the finisher box and the handle assembly of FIG. 13, including the handle assembly coupled to the finisher box.
Figure 15:
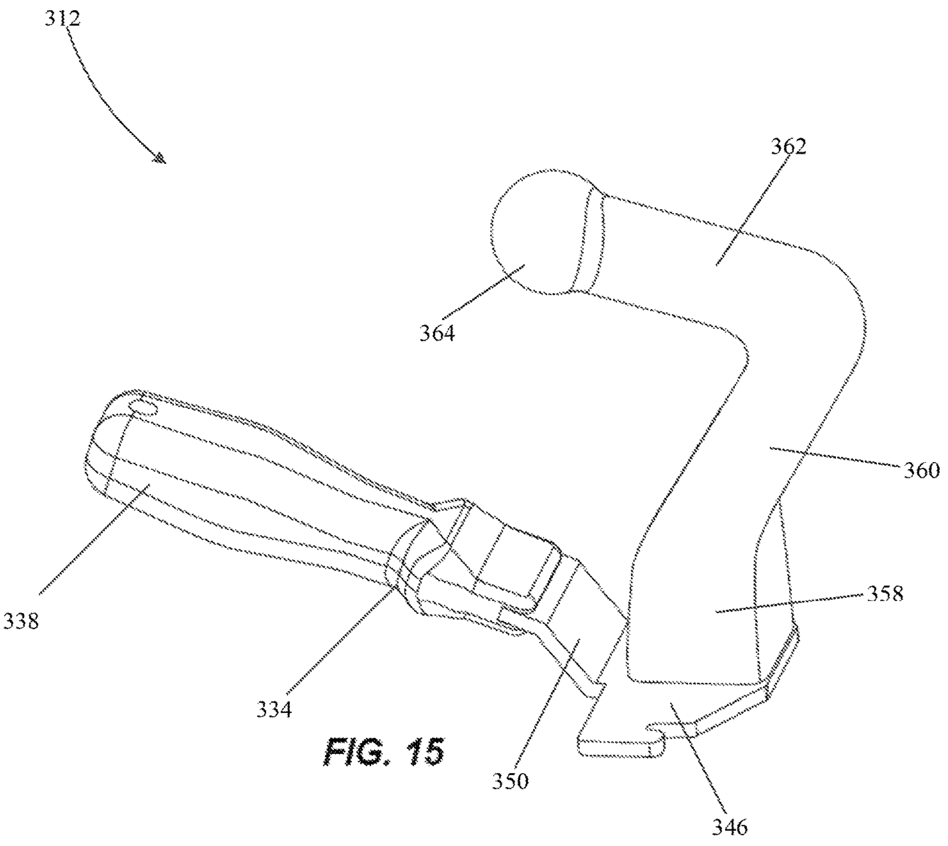
FIG. 15 illustrates a perspective view of the finisher box and the handle assembly of FIGS. 13-14, with the handle assembly in a different orientation from that of FIGS. 12-14.

FIGS. 13-15 illustrate a container or finisher box 310 according to a fourth embodiment of the invention that includes a removable handle assembly or accessory 312. The finisher box 310 and the handle assembly 312 of FIGS. 12-15 have similar structure to that of the finisher box 10 and the handle assembly 12 of FIGS. 1-4. Therefore, structure of the fourth embodiment similar to the first embodiment will be identified with reference numerals of the first embodiment plus "300." As the fourth embodiment is also similar to the third embodiment, only the differences between the third and fourth embodiments will be discussed herein.

FIGS. 12-15 illustrate the connector plate 346 including the first edge 347*a*, the second edge 347*b* parallel to the first edge 347*a*, and an extension 350. The extension 350 includes a first end 352 and a second end 354. The first end 352 is coupled to the connector plate 346, whereas the second end 354 couples to and extends into the first handle 334.

FIGS. 12-15 illustrate a second handle 356 in place of the push post 36. Similar to above, the second handle 356 and the first handle 334 may also be attached to one another or to the connector plate 346 or the extension 350 in one of the ways as described above and below, or in other ways not described within.

The second handle 356 resembles a "seven" in shape and includes a vertical portion 358, a first angled portion 360, and a second angled portion 362 that defines the second gripping portion. The vertical portion 358, similar to the push post 236 of the third embodiment, extends substantially orthogonal to the connector plate 346. Therefore, when pressure is applied to the second handle 356, force is exerted orthogonally to the connector plate 346. The first angled portion 360 includes a longitudinal axis and extends from the vertical portion 358 partially in the same direction that the vertical portion 358 extends (i.e., away from the connector plate 346), but also toward the first handle 334. In FIGS. 12-14, the second angled portion 362 includes a longitudinal axis and extends from the first angled portion 360 away from the first handle 334, such that the longitudinal axis of the first angled portion 360 and the longitudinal axis of the second angled portion 362 intersect to form an acute angle. The second angled portion 362 may extend from the first angled portion 358 as illustrated in FIGS. 12-15, i.e., either slightly away from the connecter plate 346, or it may be substantially parallel to the connector plate 346. The second angled portion 362 may also include a knob 364 at an end of the second angled portion 362 away from the first angled portion 360.

Some operators may prefer the second handle 356 extend toward the first handle 334, as shown in FIG. 15, as opposed to the first orientation illustrated in FIGS. 12-14. Therefore, to allow the operator's preference, the second handle 356 is capable of being reversed. FIG. 15 illustrates the second handle 356 rotated 180 degrees compared to the second handle 356 shown in FIGS. 12-14. In the preferred embodiment, the second handle 356 includes four threaded openings (not shown) which at least partially extend through the vertical portion 358 and may further extend into the first angled portion 360. The connector plate 346 also includes four holes (not shown) that substantially align with the openings of the second handle 356. Four threaded fasteners (not shown) extend through the holes of the connector plate 346 and into the openings of the second handle 356. The fasteners are tightened to secure the second handle 356 to the connector plate 346. Therefore, when the fasteners are removed, the second handle 356 may be reoriented and refastened to the connector plate 346 in a different operator's preferred orientation. Although described as requiring four holes, four openings, and four fasteners, any number of holes, openings, and fasteners sufficient to secure the second handle 356 to the connector plate 346 may be used. Similarly, the second handle 356 may be rotated either less or more than 180 degrees and secured by other methods not described within. Those other methods may provide possibilities of orientating and securing the second handle 356 in a manner not illustrated in FIGS. 12-15.

In reference to the four embodiments, the length of the first handle 34, 134, 234, 334 can vary greatly depending on the operator's preference. The end of the first handle 34, 134, 234, 334 may include an attachment (not shown) configured to attach an extension pole. The extension pole would allow an operator to use the finisher box 10, 110, 210, 310 in difficult to reach places, such as ceilings. The embodiments illustrated show a first handle 34, 134, 234, 334 that has a relatively short length, however, embodiments not shown may include a first handle design 34, 134, 234, 334 that has a much greater length allowing an operator to reach ceilings, or the other difficult areas, without the use of the extension.

Other handle shapes and connections other than those illustrated herein, which may have various amounts of flexibility (and means of achieving that flexibility), as well as rigid connections, may be used. For example, the first handle 34, 134, 234, 334 could be thinner and longer, similar to handles used on many garden tools. The push post 36, 136, 236 could be removable or have a variety of shapes, similar to that shown in FIGS. 12-15 and described above. For example, the rounded flat distal end of the push post 36, 136, 236 shown herein could be replaced by many other possible shapes.

Various features and advantages of the invention are set forth in the following claims.

What is claimed is:

1. A handle assembly for a container for dispensing a seaming compound, the container having a pivotally mounted pressure plate with a fastener extending from a top side thereof, the handle assembly comprising:

a connector plate having a bottom surface engageable with the pressure plate, a top surface opposite the bottom surface, and an edge extending between the bottom surface and the top surface;

a notch defined in the edge of the connector plate in which the fastener on the pressure plate is receivable for securing the connector plate to the pressure plate;

a first handle for gripping with a first hand of a user; and a second handle for gripping with a second hand of the user, wherein each of the first handle and the second handle is coupled to the connector plate.

2. The handle assembly according to claim 1, wherein the second handle is removably coupled to the connector plate.

3. The handle assembly according to claim 1, wherein the second handle is coupled to the connector plate in a first orientation or a second orientation, wherein the second orientation is 180 degrees from the first orientation.

4. The handle assembly according to claim 1, wherein the top surface of the connector plate defines a plane, wherein the first handle includes a first longitudinal axis that intersects non-orthogonally with the plane, and wherein the second handle includes a second longitudinal axis that intersects orthogonally with the plane.

5. The handle assembly according to claim 1, wherein the top surface of the connector plate defines a plane, wherein the second handle includes a vertical portion, a first angled portion, and a second angled portion, the vertical portion coupled to the connector plate, the first angled portion extending from the vertical portion such that longitudinal axes of the vertical portion and of the first angled portion, respectively, form an obtuse angle, the second angled portion defining a gripping surface, the second angled portion extending from the first angled portion such that the longitudinal axis of the first portion and a longitudinal axis of the second angled portion form an acute angle, and wherein the longitudinal axis of the vertical portion intersects substantially orthogonally with the plane.

6. The handle assembly according to claim 1, wherein one of the first handle and the second handle is directly coupled to the connector plate, and wherein the other of the first handle and the second handle is directly coupled to one of the connector plate and the handle coupled to the connector plate.

7. The handle assembly according to claim 1, wherein the first handle is directly coupled to the second handle, and wherein the second handle is directly coupled to the connector plate.

8. The handle assembly according to claim 1, wherein both of the first handle and the second handle are directly coupled to the connector plate.

9. The handle assembly according to claim 1, wherein the notch is a first notch and the fastener is a first fastener, wherein the handle assembly further comprises a second notch defined in the edge of the connector plate in which a second fastener extending from the top side of the pressure plate is receivable for securing the connector plate to the pressure plate.

10. The handle assembly according to claim 9, wherein the second handle extends from the top surface of the connector plate, and wherein the second handle is located between the first and second notches.

11. The handle assembly according to claim 10, wherein the second handle is coupled to the connector plate in a first orientation or a second orientation, and wherein the second orientation is 180 degrees from the first orientation.

12. The handle assembly according to claim 10, wherein the top surface of the connector plate defines a plane, wherein the first handle defines a first longitudinal axis that intersects non-orthogonally with the plane, and wherein a portion of the second handle defines a second longitudinal axis that intersects the connector plate orthogonally with the plane.

13. The handle assembly according to claim 12, wherein the second handle includes a spherical knob gripped by the user.

14. The handle assembly according to claim 1, further comprising an extension, wherein the first handle is directly coupled to the extension, and wherein the extension is directly coupled to the connector plate.

15. The handle assembly according to claim 14, wherein the extension is integrally formed with the connector plate as a single piece.

16. The handle assembly according to claim 15, wherein the extension extends into the second handle.

17. The handle assembly according to claim 16, wherein the edge of the connector plate is a front edge, wherein the connector plate further comprises a rear edge extending between the bottom surface and the top surface, and wherein the extension protrudes from the rear edge of the connector plate.

18. The handle assembly according to claim 17, wherein the extension is oriented at an oblique angle relative to the top surface of the connector plate.

* * * * *